United States Patent
Cho et al.

(10) Patent No.: US 10,388,033 B2
(45) Date of Patent: Aug. 20, 2019

(54) TEXTURE PROCESSING APPARATUS AND METHOD

(71) Applicant: Samsung Electronics Co., Ltd., Suwon-si (KR)

(72) Inventors: Yeongon Cho, Hwaseong-si (KR); Seok Kang, Yongin-si (KR); Soojung Ryu, Hwaseong-si (KR); Jeongae Park, Seoul (KR); Woong Seo, Hwaseong-si (KR); Sangheon Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 42 days.

(21) Appl. No.: 15/098,786

(22) Filed: Apr. 14, 2016

(65) Prior Publication Data
US 2017/0032543 A1 Feb. 2, 2017

(30) Foreign Application Priority Data
Jul. 29, 2015 (KR) .......................... 10-2015-0107516

(51) Int. Cl.
*G06T 11/00* (2006.01)
*G06T 15/00* (2011.01)
*G06T 15/04* (2011.01)
*G06T 1/20* (2006.01)
*G06T 1/60* (2006.01)

(52) U.S. Cl.
CPC .............. *G06T 11/001* (2013.01); *G06T 1/20* (2013.01); *G06T 1/60* (2013.01); *G06T 15/005* (2013.01); *G06T 15/04* (2013.01)

(58) Field of Classification Search
CPC .......... G06T 11/001; G06T 1/20; G06T 15/04
See application file for complete search history.

(56) References Cited

U.S. PATENT DOCUMENTS 5,874,969 A * 2/1999 Storm ....................... G06T 1/20
345/505
7,034,849 B1 * 4/2006 Weybrew ............ G06F 9/30021
345/473
(Continued)

FOREIGN PATENT DOCUMENTS

EP 2261862 12/2010
KR 10-2011-0002098 A 1/2011

OTHER PUBLICATIONS

Extended European Search Report dated Dec. 12, 2016 in co-pending Application No. 16172387.9.
(Continued)

*Primary Examiner* — Samantha (Yuehan) Wang
(74) *Attorney, Agent, or Firm* — F. Chau & Associates, LLC

(57) ABSTRACT

A texture processor includes: a texture cache configured to store textures; a controller configured to determine a texture address corresponding to a requested texture among the stored textures and read a texture corresponding to the texture address from the texture cache; a format converter configured to convert a format of the read texture into another format, based on a degree of texture precision required by a graphics processing unit (GPU); and a texture filter configured to perform texture filtering using the read texture having its format converted into the another format.

20 Claims, 14 Drawing Sheets

(56) References Cited

U.S. PATENT DOCUMENTS

| | | | |
|---|---|---|---|
| 7,274,373 B1* | 9/2007 | Bastos | G09G 5/024 345/586 |
| 8,149,243 B1* | 4/2012 | Kilgard | G06T 15/04 345/530 |
| 8,411,105 B1 | 4/2013 | Hutchins | |
| 8,633,936 B2 | 1/2014 | Du et al. | |
| 2002/0184282 A1* | 12/2002 | Yuval | G06F 7/483 708/495 |
| 2005/0066205 A1 | 3/2005 | Holmer | |
| 2008/0235316 A1 | 9/2008 | Du et al. | |
| 2009/0295819 A1* | 12/2009 | Buchner | G06T 15/04 345/581 |
| 2010/0060629 A1* | 3/2010 | Rasmusson | G06T 15/005 345/419 |
| 2014/0176590 A1 | 6/2014 | Lee et al. | |
| 2015/0054845 A1* | 2/2015 | Makarov | G06T 15/005 345/582 |
| 2015/0358810 A1* | 12/2015 | Chao | H04W 4/001 455/418 |
| 2016/0203583 A1* | 7/2016 | Shoshan | G06T 1/20 345/428 |

OTHER PUBLICATIONS

Akenine-Moller, et al., "Real-Time Rendering", Third Edition, pp. 172-178.

Rudd, et al., "Texture Caches", IEEE Computer Society, 2012 IEEE, pp. 136-141.

Kwon, et al., "Mobile GPU Shader Processor based on Non-blocking Coarse Grained Reconfigurable Arrays Architecture", 2013 IEEE, pp. 198-205.

Koskela, et al., "Optimization Techniques for 3D Graphics Deployment on Mobile Devices", 3D Res (2015) 6:8, pp. 1-27.

Hosseini, et al., "Energy-Aware Adaptations in Mobile 3D Graphics", MM'12, Oct. 29-Nov. 2, 2012, Nara Japan, pp. 1017-1020.

* cited by examiner

TEXTURE PROCESSING APPARATUS AND METHOD

CROSS-REFERENCE TO RELATED APPLICATION(S)

This application claims the benefit of Korean Patent Application No. 10-2015-0107516, filed on Jul. 29, 2015, in the Korean Intellectual Property Office, the entire disclosure of which is incorporated herein in by reference for all purposes.

BACKGROUND

1. Field

The following description relates to texture processing apparatuses and methods.

2. Description of Related Art

A graphics processing unit (GPU) includes a texture processor to reduce an amount of calculation and increase rendering speed during a pixel shading process of a three-dimensional (3D) graphics rendering process.

The texture processor performs a process of generating a texture required for texturing. Texturing is a process of adding a prepared image to an object formed in a 3D space, and is one of operations included in 3D graphics rendering for reducing the amount of calculation performed. The prepared image is referred to as a texture. The texture may be compressed and stored beforehand in an external memory of the texture processor.

The texture processor transmits a texture required by a shader core upon receiving, from the external memory, a compressed texel block obtained by compressing texels constituting a texture in predetermined block units, and processing the compressed texel block.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one general aspect, a texture processor includes a texture cache configured to store textures; a controller configured to determine a texture address corresponding to a requested texture and read a texture, among the stored textures, corresponding to the texture address from the texture cache; a format converter configured to convert a format of the read texture into another format, based on a degree of texture precision required by a graphics processing unit (GPU); and a texture filter configured to perform texture filtering using the texture having its format converted into the another format.

The format converter may be configured to determine an output format of the texture based on the degree of texture precision required by the GPU, and output the read texture in the determined output format.

The format converter may be configured to determine the degree of texture precision required by the GPU based on at least one of a texture filtering mode and a type of an application programming interface (API) used in the GPU, and determine whether the format of the read texture is to be converted, based on a result of the determining of the degree of texture precision.

The format converter may be configured to convert the format of the read texture into the another format when the texture filtering mode is not a preset mode that requires that the format of the read texture be maintained and the type of the API is not a preset type that requires a high degree of precision.

The format converter may be configured to determine the degree of texture precision required by the GPU by further taking into account a level of rendering that the GPU is requested to perform.

The format converter may be configured to convert the format of the read texture into the another format when the texture filtering mode is not a preset mode that requires that the format of the read texture be maintained, the type of the API is not a preset type that requires a high degree of precision, and the level of rendering that the GPU is requested to perform is less than or equal to a predetermined level.

The level of rendering that the GPU is requested to perform may be determined by a user through an application linked to the GPU or determined by the GPU based on hardware resources of the GPU.

The texture filter may be configured to perform texture filtering by driving a filter corresponding to the converted format.

The texture processor may further include a decompressor configured to decompress the read texture. The format converter may be configured to convert a format of the decompressed texture into another format, based on the degree of precision of the texture required by the GPU.

The texture processing unit may further include a decompressor configured to decompress the read texture having its format converted into the another format. The texture filter may be configured to perform texture filtering using the decompressed texture.

According to another general aspect, a texture processing method includes: determining a texture address corresponding to a requested texture; reading the texture corresponding to the texture address from a texture cache; converting a format of the read texture into another format, based on a degree of texture precision required by a graphics processing unit (GPU); and performing texture filtering using the read texture having its format converted into the another format.

The converting of the format of the read texture may include: determining an output format of the read texture based on the degree of texture precision required by the GPU; and outputting the read texture in the determined output format.

The determining of the output format of the texture may include determining the degree of texture precision required by the GPU based on at least one of a texture filtering mode and a type of an application programming interface (API) used in the GPU; and determining whether the format of the read texture is to be converted, based on a result of determining the degree of texture precision.

The determining of whether the format of the texture is to be converted may include converting the format of the read texture into the another format when the texture filtering mode is not a preset mode that requires that the format of the read texture be maintained and the type of the API is not a preset type that requires a high degree of precision.

The determining of the degree of texture precision may include determining the degree of texture precision required by the GPU by further taking into account a level of rendering that the GPU is requested to perform.

The determining of whether the format of the read texture is to be converted may include converting the format of the read texture into the another format when the texture filtering mode is not a preset mode that requires that the format of the read texture be maintained, the type of the API is not a preset type that requires a high degree of precision, and the level of rendering that the GPU is requested to perform is less than or equal to a predetermined level.

The performing of the texture filtering may include performing texture filtering by driving a filter corresponding to the converted format.

The texture processing method may further include decompressing the read texture. The converting of the format of the read texture may include converting a format of the decompressed texture based on the degree of texture precision required by the GPU.

The texture processing method may further include decompressing the read texture having its format converted. The performing of the texture filtering may include performing texture filtering using the decompressed texture.

According to another general aspect, a non-transitory computer-readable recording medium includes programmed instructions operable to cause a computer to perform the texture processing method.

According to another general aspect a texture processor includes: a controller configured to read a texture from among stored textures in response to a texture request; a format converter configured to determine whether to convert the read texture into a converted texture having a different format than the read texture, based on a degree of texture precision required by a graphics processing unit (GPU); and a texture filter configured to perform texture filtering using the read texture or the converted texture.

The format converter may be configured to determine the degree of texture precision required by the GPU based on at least one of a texture filtering mode and a type of an application programming interface (API) used in the GPU.

The format converter may be configured to convert the read texture into the converted texture when the texture filtering mode is not a preset mode that requires that the format of the read texture be maintained and the type of the API is not a preset type that requires a high degree of precision.

The format converter may be configured to determine the degree of texture precision required by the GPU by further taking into account a level of rendering that the GPU is requested to perform.

The format converter may be configured to convert read texture into the converted texture when the texture filtering mode is not a preset mode that requires that the format of the read texture be maintained, the type of the API is not a preset type that requires a high degree of precision, and the level of rendering that the GPU is requested to perform is less than or equal to a predetermined level.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
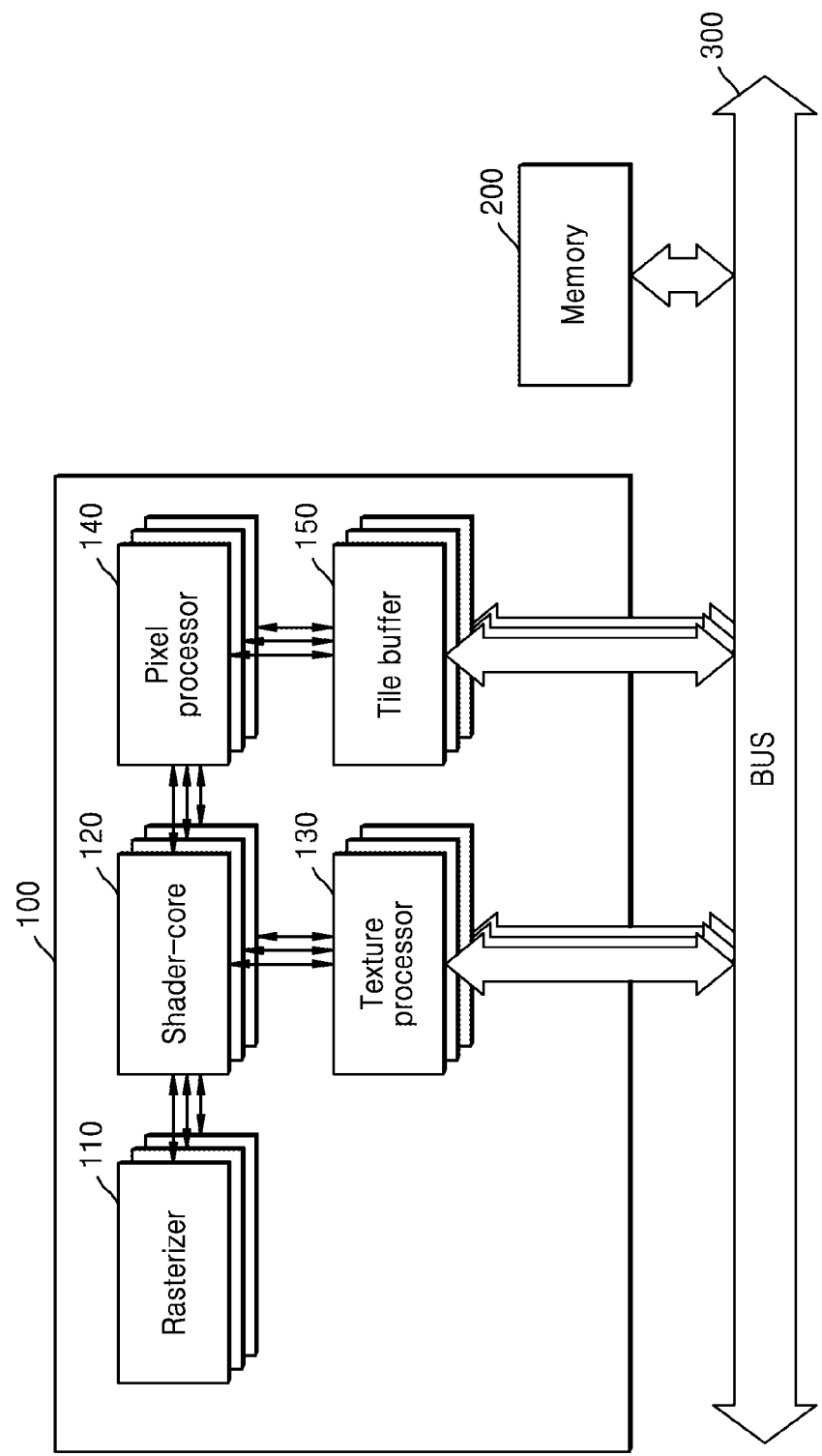
FIG. 1 is a block diagram of a graphics processing unit (GPU) according to an embodiment.

FIG. 1 is a block diagram of a graphics processor or graphics processing unit (GPU) 100 according to an embodiment. The GPU 100 may further include other general components in addition to components illustrated in FIG. 1.

Referring to FIG. 1, the GPU 100 includes a rasterizor 110, a shader core 120, a texture processor 130, a pixel processor 140 and a tile buffer 150. The GPU 100 exchanges data with a memory 200 outside the GPU 100 via a bus 300.

The GPU 100 employs a tile-based rendering (TBR) method. In other words, in order to generate 3D graphics corresponding to one frame, the GPU 100 processes tiles having a predetermined size into which the frame is divided using the rasterizer 110, the shader core 120, and the pixel processor 140, and stores a processing result in the tile buffer 150. The GPU 100 may process all the tiles constituting the frame in parallel by using channels each including the rasterizor 110, the shader core 120, and the pixel processor 140. When the tiles corresponding to the frame are processed, the GPU 100 transmits the result of processing the tiles, which is stored in the tile buffer 150, to a frame buffer (not shown) of the memory 200.

The rasterizor 110 performs rasterization on a primitive generated by a vertex shader through a geometric conversion process.

The shader core 120 receives the rasterized primitive from the rasterizor 110 and performs pixel shading on the rasterized primitive. The shader core 120 performs pixel shading on tiles including fragments of the primitive generated through rasterization to determine colors of all pixels of the tiles. The shader core 120 uses pixel values generated using a texture during pixel shading to generate realistic 3D graphics.

The shader core 120 may include a pixel shader (not shown). The shader core 120 may further include a vertex shader or may be an integrated shader in which a vertex shader and a pixel shader are integrally formed. When the shader core 120 functions as a vertex shader, the shader core 120 generates a primitive representing an object and transmits the primitive to the rasterizor 110.

When the shader core 120 requests the texture processing unit 130 to provide a pixel value corresponding to a desired pixel, the texture processor 130 provides the shader core 120 with a pixel value generated by processing a prepared texture. The texture is stored in an internal or external space of the texture processor 130, or the memory 200 outside the GPU 100. When the texture that is to be used to generate the pixel value requested by the shader core 120 is not stored in the internal space of the texture processor 130, the texture processing unit 130 receives and use the texture stored in the external space of the texture processor 130 or the memory 200.

The pixel processor 140 determines all pixel values corresponding to one tile by determining pixel values to be finally displayed by performing a process, such as a depth test, on pixels corresponding to the same location on one tile.

The tile buffer 150 stores all of the pixel values corresponding to the one tile transmitted from the pixel processor 140. When graphics processing is completely performed on all tiles constituting one frame, a result of processing the tiles, which is stored in the tile buffer 150, is transmitted to the frame buffer of the memory 200.

Figure 2:
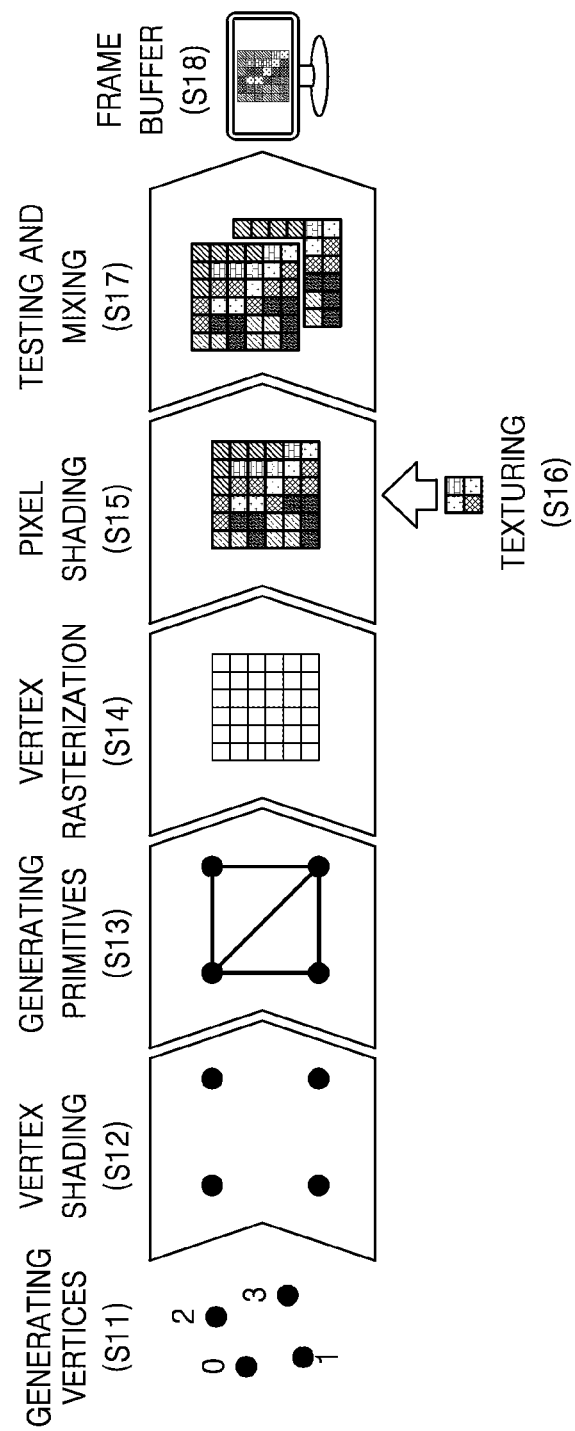
FIG. 2 is a diagram illustrating an example of a process of processing three-dimensional (3D) graphics, performed by the GPU.

FIG. 2 is a diagram illustrating a process of processing 3D graphics, performed by the GPU 100.

A process of processing 3D graphics may be largely divided into three operations, i.e., geometric conversion, rasterization, and pixel shading, as will be described in more detail with reference to FIG. 2 below. FIG. 2 illustrates a process of processing 3D graphics, including operations S11 to S18.

In operation S11, vertices are generated to represent objects including in 3D graphics.

In operation S12, the vertices are shaded. A vertex shader shades the vertices generated in operation S11 by designating locations of the vertices.

In operation S13, primitives are generated. The term "primitive" includes a dot, a line, a polygon, etc., which is formed using at least one vertex. For example, a primitive may be represented as a triangle formed by connecting vertices to one another.

In operation S14, the primitives are rasterized. The rasterizing of the primitives means dividing each of the primitives into fragments. The fragments are basic units for performing graphics processing on the primitives. Since the primitives contain only information regarding vertices, fragments between vertices are generated during the rasterizing of the primitives to perform graphics processing on the 3D graphics.

In operation S15, pixels are shaded. The fragments constituting the primitives, which are generated through the rasterizing of the primitives, may be pixels that constitute a tile. In the technical field to which the disclosure pertains, the terms 'fragment' and 'pixel' may be interchangeably used with each other in some cases. For example, a pixel shader may also be referred to as a fragment shader. In general, a basic unit of graphics processing that constitutes a primitive may be referred to as a fragment, and a basic unit of the graphics processing after pixel shading may be referred to as a pixel. In pixel shading, colors of the pixels are determined.

In operation S16, texturing is performed to determine colors of the pixels. Texturing is a process of determining the colors of pixels using a texture, which is an image prepared beforehand. When the colors of pixels are calculated and determined to express various colors and patterns of a real world, the amount of calculating data required for graphics processing and a graphics processing time increase. Thus, the colors of the pixels are determined using the prepared texture. For example, the colors of the pixels may be determined by storing a color of a surface of an object in the form of a texture which is an additional two-dimensional (2D) image, and increasing/decreasing the size of the stored texture according to the location, size, etc. of the object on a screen or blending texel values using textures having various resolutions.

More specifically, during pixel shading, to more rapidly process 3D graphics, pixel values generated using a prepared texture are used. In this case, in order to adaptively handle the size of an object, textures having different resolutions may be prepared beforehand and pixel values may be generated from a combination of the textures. In this case, the prepared textures having different resolutions are referred to as mipmaps. For example, in order to generate pixel values of an object having an intermediate resolution between the resolutions of two mipmaps prepared beforehand, texel values of a location corresponding to the object may be extracted from the two mipmaps and be then filtered.

In operation S17, testing and mixing are performed. Pixel values corresponding to one tile are determined by performing a process, e.g., a depth test, on pixels corresponding to the same location on the one tile to determine pixel values to be finally displayed. 3D graphics corresponding to one frame are generated by mixing tiles generated through the above process.

In operation S18, the frame generated by performing operations S11 to S17 is stored in a frame buffer, and the frame stored in the frame buffer is displayed on a display device (not shown).

Figure 3:
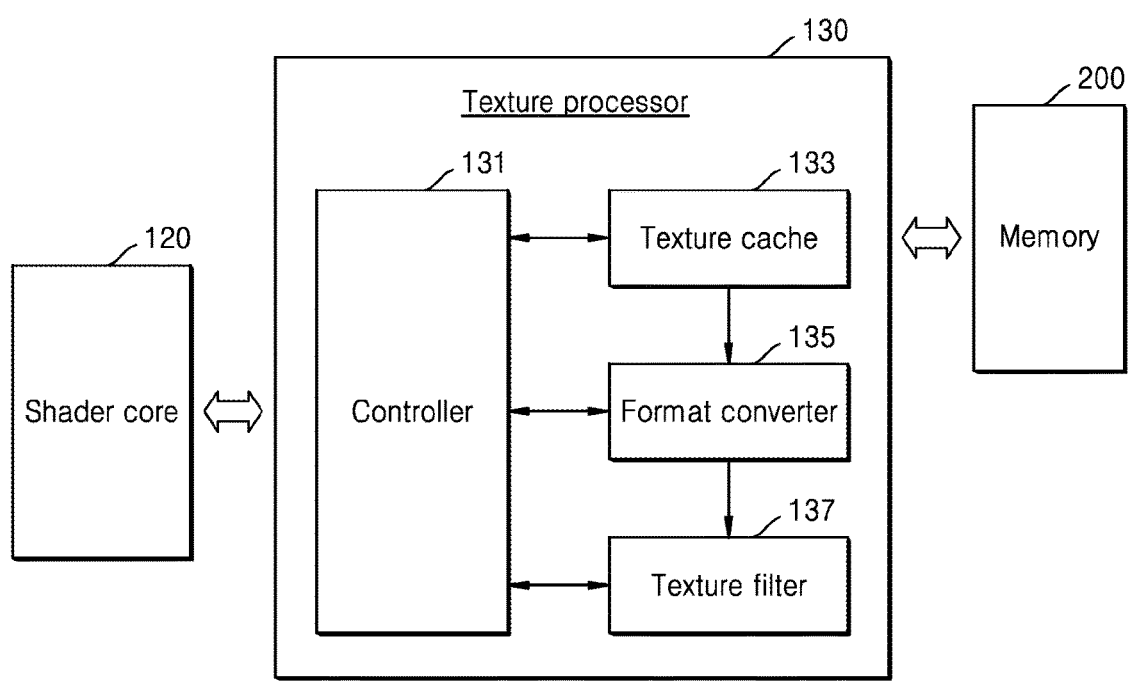
FIG. 3 is a block diagram for explaining the structure and operation of a texture processor according to an embodiment.

FIG. 3 is a block diagram for explaining the structure and operation of a texture processor 130 according to an exemplary embodiment.

Referring to FIG. 3, the texture processor 130 is located between the shader core 120 and the memory 200, and includes a controller 131, a texture cache 133, a format converter 135, and a texture filter 137. The texture processor 130 processes a texture requested by the shader core 120 and transmits the processed texture to the shader core 120. The texture processor 130 receives a request to provide the texture from the shader core 120 by receiving the coordinates of the texture corresponding to a pixel to be processed by the shader core 120. The texture processor 130 receives a texture that is not stored in the texture cache 133 from the memory 200.

The controller 131 performs arithmetic operations required to control the texture processing unit 130. The controller 131 controls the texture cache 133, the format converter 135, and the texture filter 137 to control overall operations of the texture processor 130.

The controller 131 determines a texture address corresponding to the texture that the texture processing unit 130 is requested to provide. In other words, the controller 131 converts the coordinates of the texture received from the shader core 120 into an address in the texture cache 133, where the texture corresponding to the coordinates is stored. The controller 131 reads a texture corresponding to the texture address from the texture cache 133.

The texture cache 133 stores textures. More specifically, the texture cache 133 stores some textures received from the memory 200 to minimize a delay in graphics processing due to the exchange of data between the texture processing unit 130 and the memory 200. The texture cache 133 may be a module installed separately from the texture processor 130. For example, the texture cache 133 may be embodied as a separate module located between the texture processor 130 and the memory 200.

The format converter 135 converts a format of the texture read from the texture cache 133, based on a degree of precision of a texture required by the GPU 100 of FIG. 1. First, a format of a texture will be described with reference to FIG. 4 below.

Figure 4:
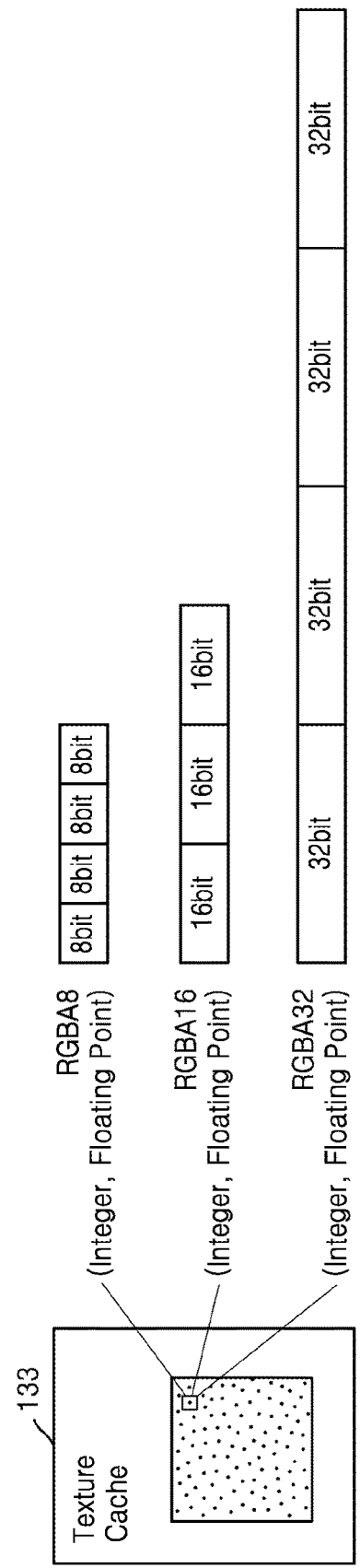
FIG. 4 is a diagram for explaining an example of a format of a texture.

FIG. 4 is a diagram for explaining a format of a texture. Textures may have various types of formats. For example, a texture may basically have a format such as an integer RGBA 8-bit format, an integer RGBA 16-bit format, an integer RGBA 32-bit format, a floating RGBA 16-bit format, or a floating RGBA 32-bit format, or a combination thereof.

As illustrated in FIG. 4, the textures stored in the texture cache 133 may have various types of formats. For example, in the integer RGBA 8-bit format, R, G, B, and A channels each have 8-bit integers. In the floating RGBA 32-bit format, R, G, B, and A channels each have 32-bit floating point values. In the case of the floating RGBA 32-bit format, graphics processing may be performed with higher precision than when the integer RGBA 8-bit format is used, but power consumption may be high and it may take a large amount of time to perform graphics processing. Thus, the performance of the GPU 100, e.g., the quality or speed of rendering performed by the GPU 100, may be influenced by the format of a texture. The format of a texture is closely related to an operation of the texture filter 137 of the texture processing unit 130, as will be described in detail below.

Referring back to FIG. 3, the format converter 135 determines a format of a texture, based on the degree of precision of the texture required by the GPU 100.

The format converter 135 may determine the degree of precision of the texture required by the GPU 100, based on a texture filtering mode and the type of an application programming interface (API) used in the GPU 100. Otherwise, the format converter 135 may determine the degree of precision of a texture required by the GPU 100, based on at least one of the texture filtering mode, the type of the API used in the GPU 100, and a level of rendering that the GPU 100 is requested to perform. Information such as the texture filtering mode, the type of the API used in the GPU 100, and the level of rendering that the GPU 100 is requested to perform may be obtained from either a texture request command received from the shader core 120 or graphic state information extracted from a graphic-state (G-state) memory (not shown) included in the texture processor 130. The format converter 135 determines whether the format of the texture is to be converted or not, based on a result of determining the degree of precision of the texture required by the GPU 100.

For example, the format converter 135 determines that the format of the texture is to be converted, when the texture filtering mode is not a preset mode that requires that the format of the texture be maintained and the type of the API is not a preset type of API that requires a high degree of precision. If the level of rendering that the GPU 100 is requested to perform is further taken into account, the format converter 135 determines that the format of the texture is to be converted, when the texture filtering mode is not the preset mode that requires that the format of the texture be maintained, the type of the API is not the preset type of API that requires the high degree of precision, and the level of rendering that the GPU 100 is requested to perform is less than or equal to a predetermined level.

In this case, a point filtering mode may be preset as a texture filtering mode that requires that the format of the texture be maintained. Open GL/CL or a heterogeneous system architecture (HSA) may be preset as a type of API that requires the high degree of precision.

The level of rendering that the GPU 100 is requested to perform may be determined by a user through an application linked to the GPU 100. For example, when a user uses a terminal (not shown) including the GPU 100, the user may control the level of rendering by using an application installed in the terminal. The user may set a specific quality level of rendering according to his or her preference or differently set the level of rendering according to the type of application used, and then request the GPU 100 to perform rendering at the level of rendering that the user sets. Otherwise, the level of rendering that the GPU 100 is requested to perform may be determined by the GPU 100, based on hardware resources thereof. For example, if hardware resources or residual battery power is insufficient to process a large number of threads, the GPU 100 may lower the level of rendering that the GPU 100 is requested to perform to a predetermined level or less.

In contrast, the format converter 135 may determine that the format of the texture is to be maintained when the texture filtering mode is a mode that requires that the format of the texture be maintained, e.g., the point filtering mode. Otherwise, the format converter 135 may determine that the format of the texture is to be maintained when the API used in the GPU 100 is an API that requires a high degree of precision, e.g., the Open GL/CL or the HSA. Even if the texture filtering mode is not the preset mode that requires that the format of the texture be maintained and the type of the API is not the preset type of API that requires the high degree of precision, the format converter 135 may determine that the format of the texture is to be maintained when the level of rendering that the GPU 100 is required to perform exceeds the predetermined level.

The format converter 135 outputs the texture read from the texture cache 133 in a texture format determined by the format converter 135.

The texture filter 137 performs texture filtering using texel values included in a texture. Filtering texel values means obtaining a color value corresponding to a pixel by blending the texel values. For example, the requested texture may be obtained by calculating an average of texel values included in a region of a texture space including the coordinates of the texture received by the texture processing unit 130. A value obtained by performing texture filtering by the texture filter 137 is transmitted to the shader core 120. A texture filtering mode performed by the texture filter 137 may be any of various modes, e.g., point filtering, bilinear filtering, tri-linear filtering, etc.

Point filtering is a mode in which, when a texture that is to be added to an object to be rendered is determined, four neighboring texels are obtained and a nearest texel among the four neighboring texels is output, based on the coordinates of the texture. Bilinear filtering is a mode, wherein, when a texture to be added to an object that is to be rendered is determined: four neighboring texels are obtained based on the coordinates of the texture and every two texels among the four neighboring texels are interpolated; results of interpolating the every two texels are interpolated again; and a final result of interpolating the results of interpolating the every two texels is output. Tri-linear filtering is a mode in which: bilinear filtering is performed on each of two mipmaps by using four texels selected from each of the two mipmap levels, based on the coordinates of a texture; bilinear filtering is performed again on values obtained by respectively performing bilinear filtering on the two mipmaps; and a result of performing bilinear filtering on the values is output.

The texture filter 137 performs texture filtering according to a texture format output from the format converter 135. When a format of a texture is converted by the format converter 135, the texture filter 137 performs texture filtering using the texture whose format is converted. In this case, the texture filter 137 performs texture filtering by driving a filter corresponding to a format into which the format is converted, as will be described in detail with reference to FIGS. 5 and 6 below.

Figure 5:
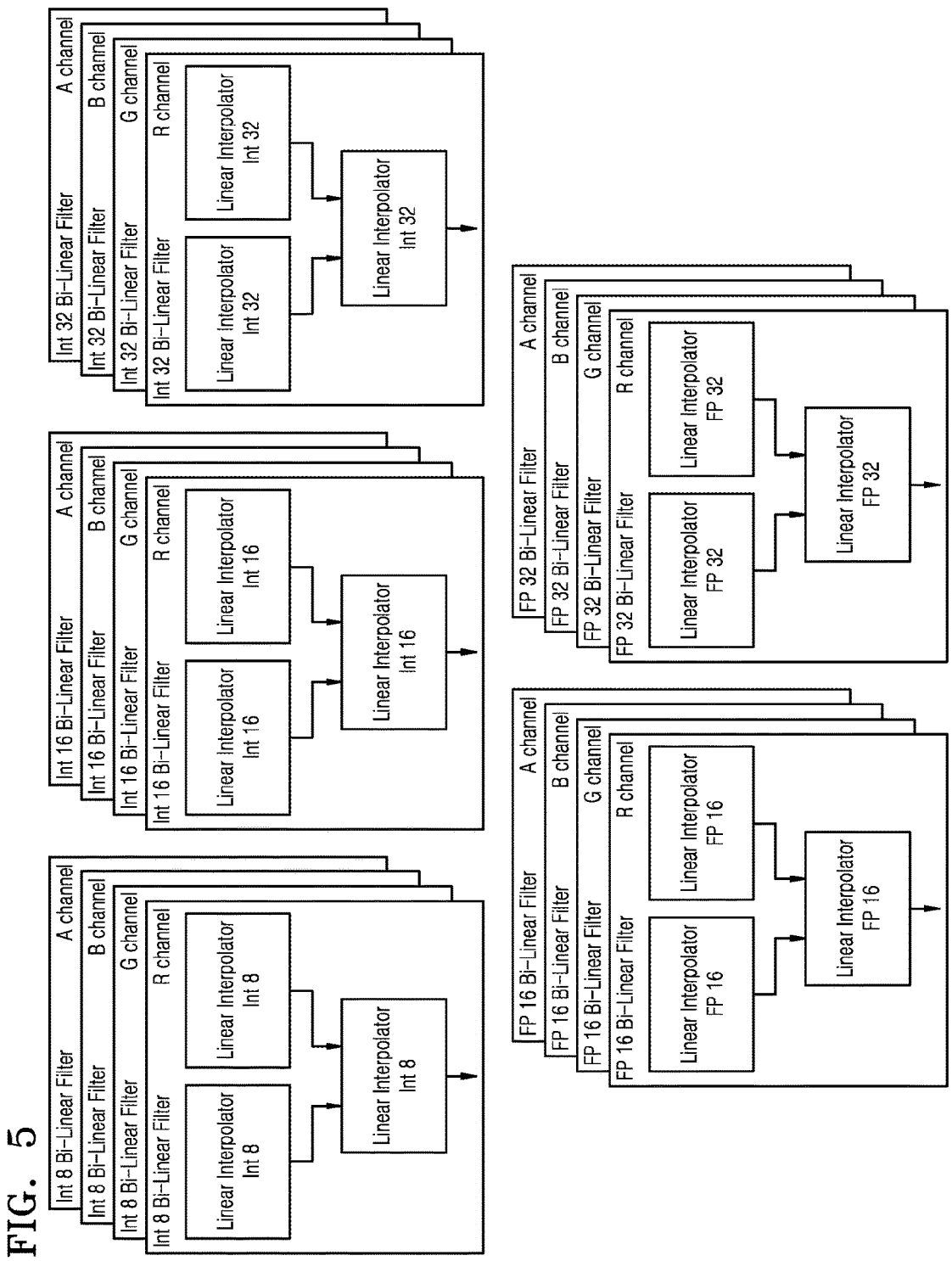
FIG. 5 is a diagram for explaining an example of the structure and operation of a texture filter.

FIG. 5 is a diagram for explaining the structure and operation of the texture filter 137. As described above with reference to FIG. 4, a texture may basically have a format, such as the integer RGBA 8-bit format, the integer RGBA 16-bit format, the integer RGBA 32-bit format, the floating RGBA 16-bit format, or the floating RGBA 32-bit format, or a combination thereof.

In the texture filter 137, in order to perform texture filtering on textures having such various formats, filters respectively corresponding to the formats may be included for each of color components.

FIG. 5 illustrates a texture filtering mode in which bilinear filtering is performed and filters respectively corresponding to the various texture formats are included for each of color components. For example, in the case of the integer RGBA 8-bit format, four 8-bit integer bilinear filters are included. In the case of the floating RGBA 16-bit format, four 16-bit floating bilinear filters are included. Also, in the case of bilinear filtering, the filter corresponding to each of the color components includes three interpolators.

Figure 6:
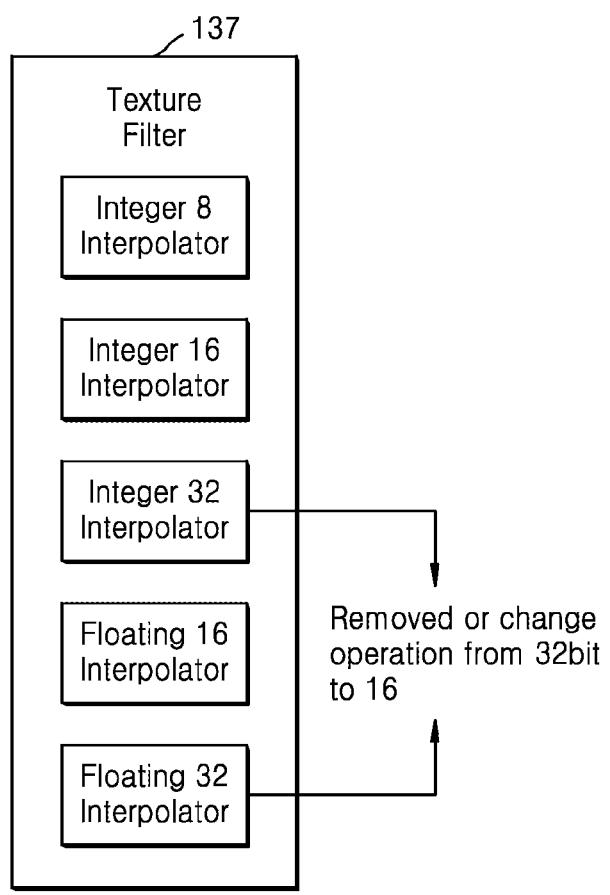
FIG. 6 is a block diagram for explaining an example of the structure and operation of a texture filter according to a change in a texture format.

FIG. 6 is a block diagram for explaining the structure and operation of the texture filter 137 in the circumstance of a change in a texture format. The texture filter 137 performs texture filtering by driving a filter corresponding to a format of a texture output from the format converter 135. When the format of the texture is converted by the format converter 135, the texture filter 137 performs texture filtering by driving a filter corresponding to a format into which the texture is converted. When a texture format having a high degree of precision is converted to a texture format having a degree of precision which is lower than the high degree of precision of the texture format, the texture filter 137 performs texture filtering by driving a filter corresponding to the format having the lower degree of precision.

For example, when the texture is converted from the integer RGBA 32-bit format to the integer RGBA 16-bit format, the texture filter 137 performs texture filtering by driving a filter corresponding to the integer RGBA 16-bit format. Similarly, when the texture is converted from the floating RGBA 32-bit format to the floating RGBA 16-bit format, the texture filter 137 performs texture filtering by driving a filter corresponding to the floating RGBA 16-bit format. As a result, the texture filter 137 performs texture filtering with lower power consumption and using less hardware resources than when texture filtering is performed without converting the texture format.

If the format converter 135 is set to respectively convert texture formats to the integer RGBA 16-bit format and the floating RGBA 16-bit format when the texture formats are the integer RGBA 32-bit format and the floating RGBA 32-bit format, filters corresponding to the integer RGBA 32-bit format and the floating RGBA 32-bit format may be removed from the texture filter 137, thereby reducing an area of the texture filter 137 occupied in the texture processor 130.

Figure 7:
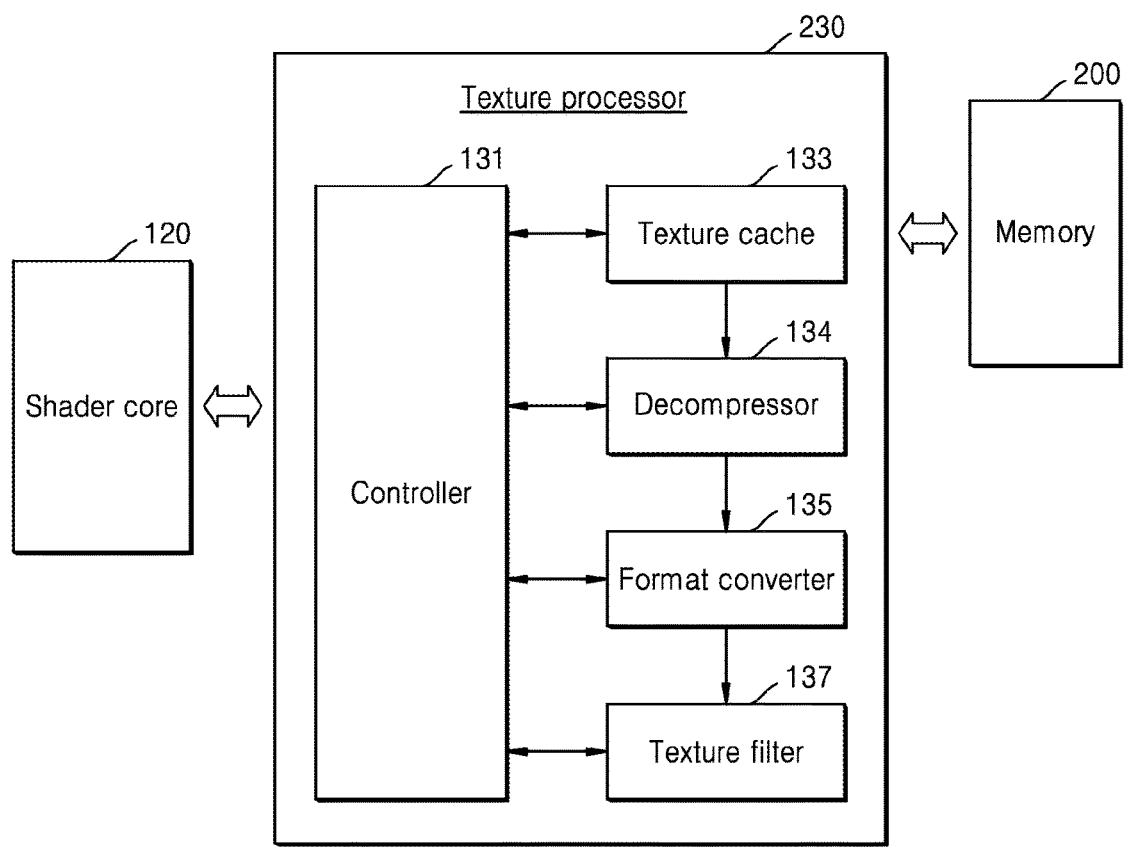
FIG. 7 is a block diagram of a texture processor according to another embodiment.

FIG. 7 is a block diagram of a texture processor 230 according to another embodiment.

Referring to FIG. 7, the texture processor 230 includes the controller 131, the texture cache 133, a decompressor 134, the format converter 135, and the texture filter 137. The texture processor 230 of FIG. 7 is different from the texture processor 130 of FIG. 3 in that an output of the texture cache 133 is input to the decompressor 134 and an output of the decompressor 134 is input to the format converter 135. Features of the embodiment of FIG. 7 that are the same as those of FIG. 3 will not be described again.

A texture is compressed, stored, and transmitted during processing of 3D graphics to satisfy demands for hardware resources and a communication environment. In general, compression is performed on texels constituting a texture in units of predetermined blocks of texels, i.e., texel blocks. According to a plurality of texture compression standards, a representative value for a texel block to be compressed is determined, a weight that is to be added to the representative value representing texel values is calculated, and the representative value and the weight are stored.

When a compressed texture read from the texture cache 133 is received, the decompressor 134 decompresses the compressed texture. Since texels constituting a texture may be compressed in units of predetermined block units, the decompressor 133 may receive a compressed texel block. The decompressor 134 may extract compression parameters, which were used to compress the texel block, from the compressed texel block, and perform interpolation to generate texel values, based on the compression parameters. Through the above process, a decompressed texture is generated. The decompressor 134 transmits the decompressed texture to the format converter 135.

The format converter 135 converts a format of the decompressed texture, based on the degree of precision of the texture required by the GPU 100.

Figure 8:
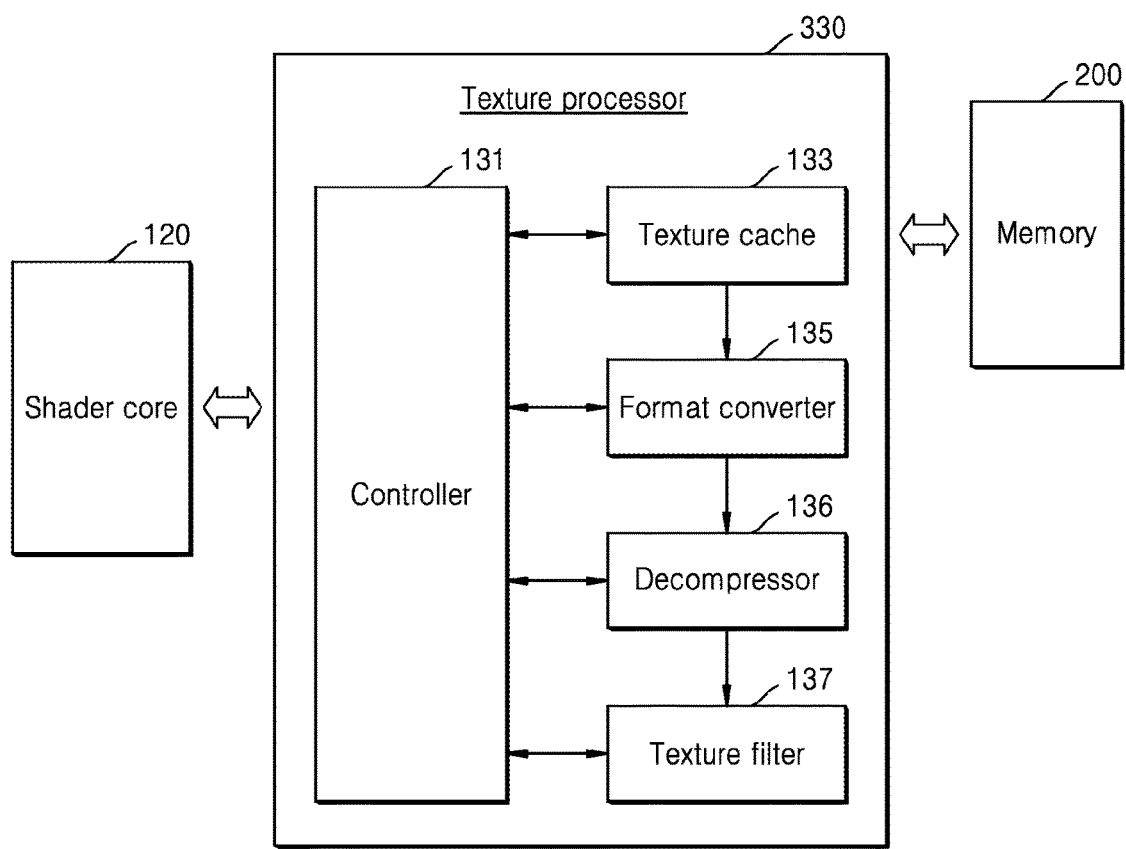
FIG. 8 is a block diagram of a texture processor according to another embodiment.

FIG. 8 is a block diagram of a texture processor 330 according to another embodiment.

Referring to FIG. 8, the texture processor 330 includes the controller 131, the texture cache 133, the format converter 135, a decompressor 136, and the texture filter 137. The texture processor 330 of FIG. 8 is different from the texture processing units 130 and 230 of FIGS. 3 and 7 in that an output of the texture cache 133 is input to the format converter 135, an output of the format converter 135 is input to the decompressor 136, and an output of the decompressor 136 is input to the texture filter 137. Parts of the texture processor 330 of FIG. 8 that are the same as those of the texture processors 130 and 230 of FIGS. 3 and 7 described above will not be described again.

When a texture output from the format converter 135 is received, the decompressor 136 decompresses the texture. When a format of the texture is converted by the format converter 135, the decompressor 136 receives a compressed texel block of the texture whose format is converted. The decompressor 136 decompresses the texture whose format is converted. The decompressor 136 transmits the decompressed texture to the texture filter 137.

The texture filter 137 performs texture filtering using the decompressed texture.

When the format converter 135 is located at an output terminal of the texture cache 133 and is to convert a format of a texture, the same effect as that when the texture whose format is converted is output from the texture cache 133 may be achieved, in response to a request to provide a texture from the controller 131.

The texture cache 133 may be embodied as an independent module spatially separated from the texture processor 330. In particular, when the format converter 135 is located at the output terminal of the texture cache 133 and the texture cache 133 and the format converter 135 are located between the texture processor 330 and the memory 200, the amount of traffic between the texture processor 330 and the texture cache 133 decreases as the format converter 135 converts the format of the texture.

For example, when the controller 131 requests the texture cache 133 to provide a texture having the integer RGBA 32-bit format, the format converter 135 located at the output terminal of the texture cache 133 converts the format of the texture into the integer RGBA 16-bit format and outputs the texture, thereby reducing the amount of traffic between the other components of the texture processor 330 and the texture cache 133.

Figure 9:
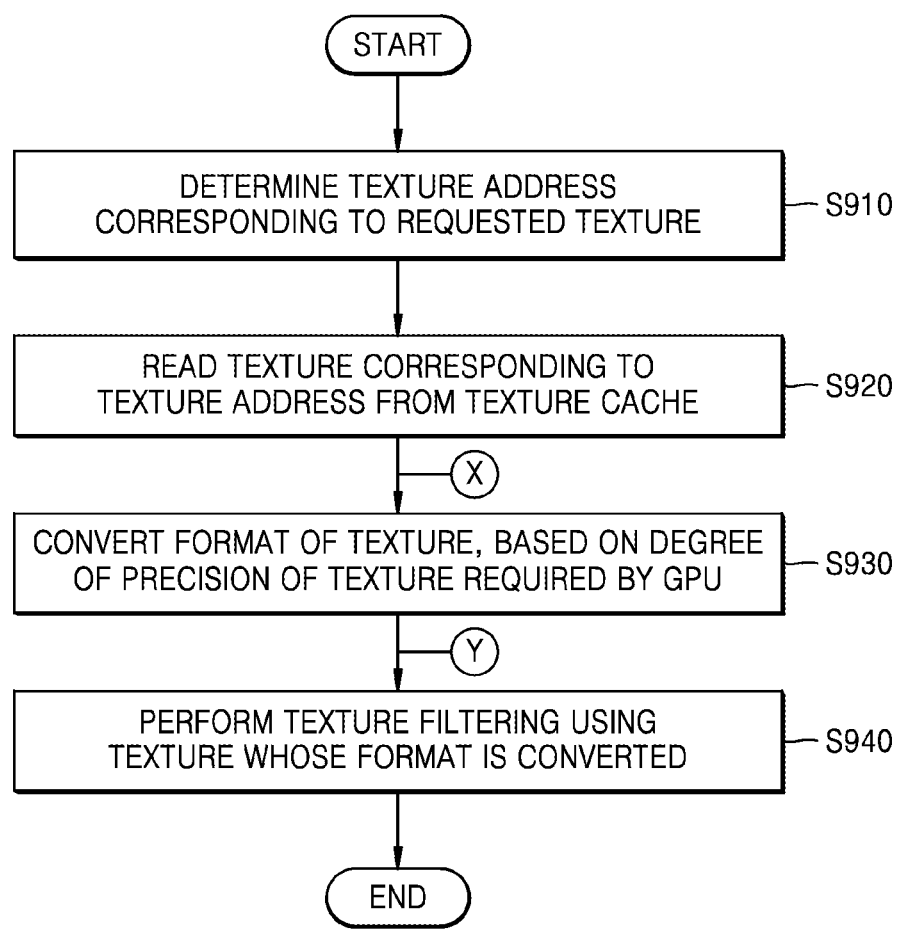
FIG. 9 is a flowchart of a texture processing method according to an embodiment.

FIG. 9 is a flowchart of a texture processing method according to an embodiment.

In operation S910, the texture processor 130/230/330 determines a texture address corresponding to a requested texture.

In operation S920, the texture processor 130/230/330 reads the texture corresponding to the texture address from the texture cache 133.

In operation S930, the texture processor 130/230/330 converts a format of the read texture, based on the degree of precision of the texture required by the GPU 100, as will be described in detail with reference to FIG. 10 below.

Figure 10:
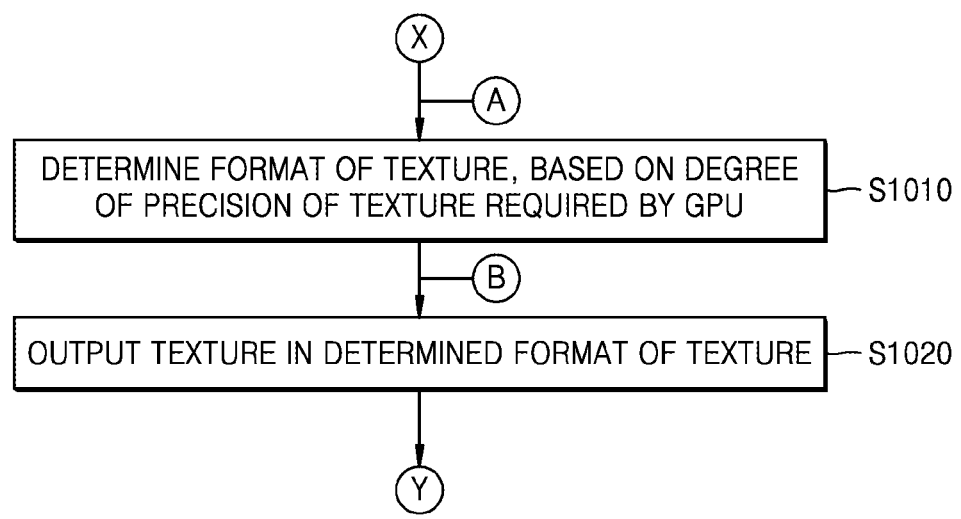
FIG. 10 is a detailed flowchart of a process of converting a format of a texture in the texture processing method, according to an embodiment.

FIG. 10 is a detailed flowchart of the converting of the format of the texture in the texture processing method of FIG. 9, according to an embodiment.

Referring to FIG. 10, in operation S1010, the texture processor 130/230/330 determines a format of the texture, based on the degree of precision of the texture required by the GPU 100, as will be described in detail with reference to FIGS. 11 and 12 below.

Figure 11:
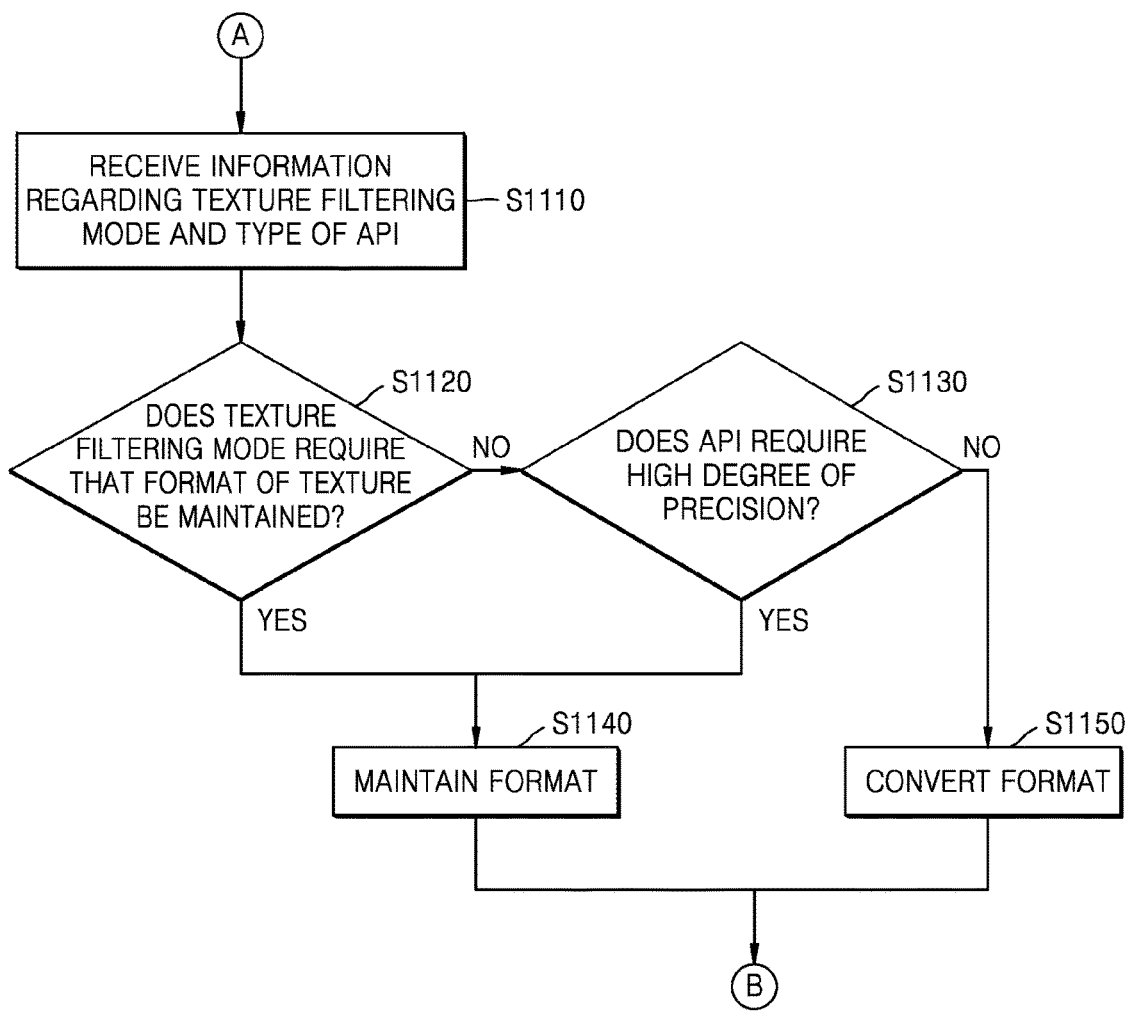
FIG. 11 is a detailed flowchart of a process of determining a format of a texture, which is included in the converting of the format of the texture in the texture processing method, according to an embodiment.

FIG. 11 is a detailed flowchart of the determining of the format of the texture in the converting of the texture format in the texture processing method, according to an embodiment.

Referring to FIG. 11, in operation S1110, the texture processor 130/230/330 receives information regarding a texture filtering mode and the type of an API used in the GPU 100. Information, such as the texture filtering mode and the type of the API used in the GPU 100, may be obtained from either a texture request command or graphic state information extracted from the G-state memory included in the texture processor 130/230/330.

In operation S1120, the texture processor 130/230/330 determines whether the texture filtering mode is a preset mode that requires that a format of a texture be maintained. In this case, the point filtering mode may be preset as a texture filtering mode that requires that a format of a texture be maintained.

When the texture filtering mode is not the preset mode that requires that a format of a texture be maintained, the texture processor 130/230/330 performs operation S1130. When the texture filtering mode is the preset mode that requires that a format of a texture be maintained, the texture processor 130/230/330 performs operation S1140.

In operation S1130, the texture processor 130/230/330 determines whether the type of the API used in the GPU 100 is a preset type of API that requires a high degree of precision. In this case, the Open GL/CL, the HSA, etc., may be preset as a type of API that requires the high degree of precision. When the type of the API used in the GPU 100 is the preset type of API that requires the high degree of precision texture, the processor 130/230/330 performs operation S1140. When the type of the API used in the GPU 100 is not the preset type of API that requires the high degree of precision texture, the processor 130/230/330 performs operation 1150.

In operation S1140, since the texture filtering mode is the preset mode that requires that a format of a texture be maintained or the type of the API used in the GPU 100 is the preset type of API that requires the high degree of precision texture, the texture processor 130/230/330 determines that the format of the texture is to be maintained.

In operation S1150, since the texture filtering mode is not the preset mode that requires that a format of a texture be maintained and the type of the API used in the GPU 100 is not the preset type of API that requires a high degree of precision texture, the texture processor 130/230/330 determines that the format of the texture is to be converted.

Figure 12:
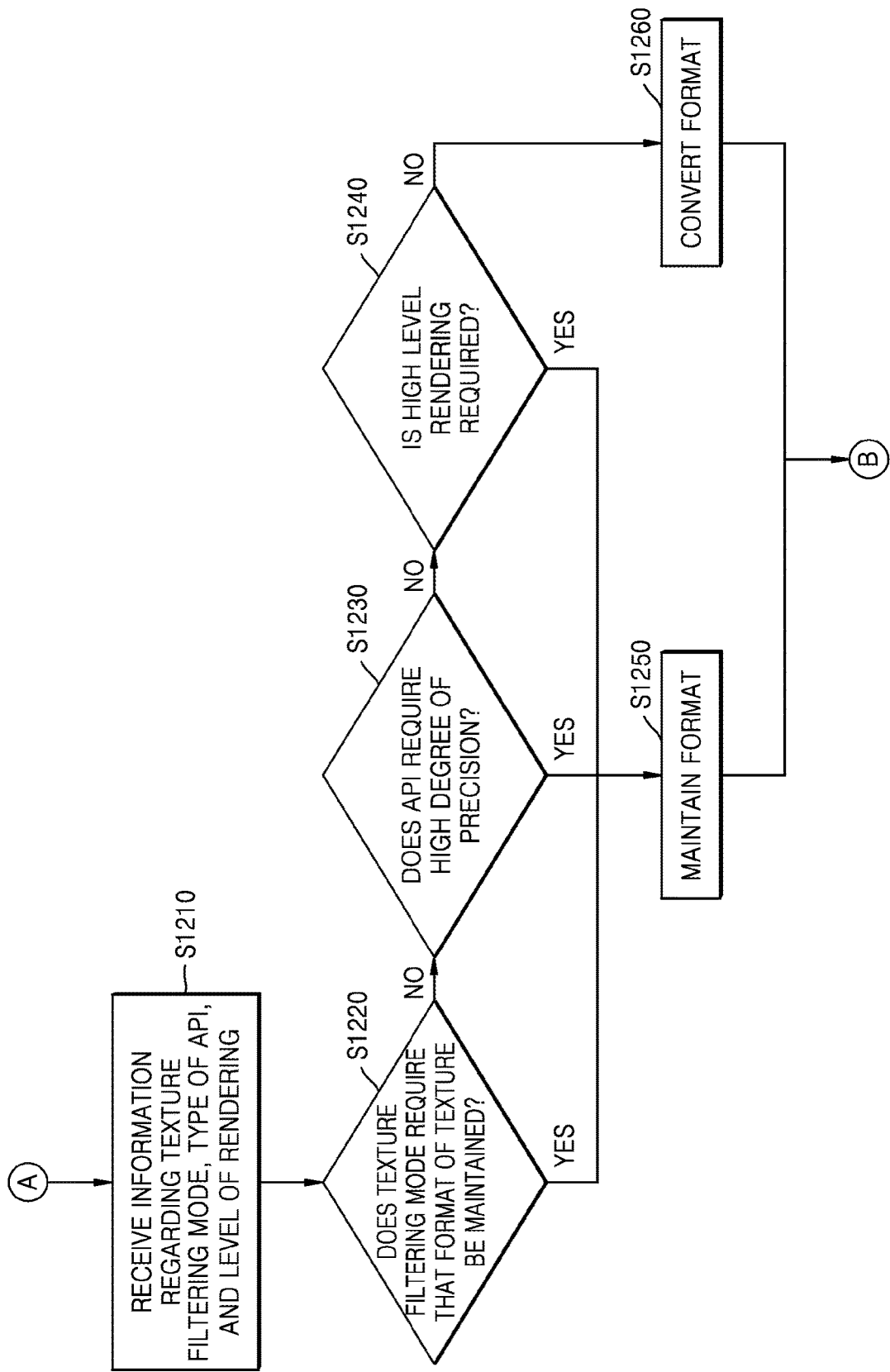
FIG. 12 is a detailed flowchart of a process of determining a format of the texture, which is included in the converting of the format of the texture in a texture processing method, according to another embodiment.

FIG. 12 is a detailed flowchart of the determining of a format of the texture, which is included in the converting of the format of the texture in the texture processing method, according to another embodiment.

In operation S1210, the texture processor 130/230/330 receives information regarding a texture filtering mode, the type of an API used in the GPU 100, and a level of rendering that the GPU 100 is required to perform. Information, such as the texture filtering mode, the type of the API used in the GPU 100, and the level of rendering that the GPU 100 is required to perform, is obtained from either a texture request command or graphic state information extracted from the G-state memory included in the texture processor 130/230/330.

In operation S1220, the texture processor 130/230/330 determines whether the texture filtering mode is the preset mode that requires that a format of a texture be maintained. In this case, the point filtering mode may be preset as a texture filtering mode that requires that a format of a texture be maintained. When the texture filtering mode is not the preset mode that requires that a format of a texture be maintained, the texture processor 130/230/330 performs operation S1230. When the texture filtering mode is the preset mode that requires that a format of a texture be maintained, the texture processor 130/230/330 performs operation S1250.

In operation S1230, the texture processor 130/230/330 determines whether the type of the API used in the GPU 100 is the preset type of API that requires a high degree of precision. In this case, the Open GL/CL, the HSA, etc. may be preset as the type of API that requires the high degree of precision. When the type of the API used in the GPU 100 is the preset type of API that requires the high degree of precision texture, the processor 130 performs operation S1250. When the type of the API used in the GPU 100 is not the preset type of API that requires the high degree of precision texture, the processor 130/230/330 performs operation 1240.

In operation S1240, the texture processor 130/230/330 determines whether the level of rendering that the GPU 100 is required to perform is less than or equal to a predetermined level. In this case, the level of rendering that the GPU 100 is required to perform is determined by a user through an application linked to the GPU 100 or is determined by the GPU 100 based on hardware resources of the GPU 100.

In operation S1250, since the texture filtering mode is the preset mode that requires that a format of a texture be maintained or the type of the API used in the GPU 100 is the preset type of the API that requires the high degree of precision texture, the texture processor 130/230/330 determines that the format of the texture is to be maintained. When the level of rendering that the GPU 100 is required to perform is greater than the predetermined level, the texture processor 130/230/330 determines that the format of the texture is to be maintained.

In operation S1260, since the texture filtering mode is not the preset mode that requires that a format of a texture be maintained, the type of the API used in the GPU 100 is not the preset type of the API that requires a high degree of precision texture, and the level of rendering that the GPU 100 is required to perform is less than or equal to the predetermined level, the texture processor 130/230/330 determines that the format of the texture is to be converted.

Referring back to FIG. 10, in operation S1020, the texture processor 130 outputs the texture read from the texture cache 133 in the format of the texture determined in operation S1010.

Figure 13:
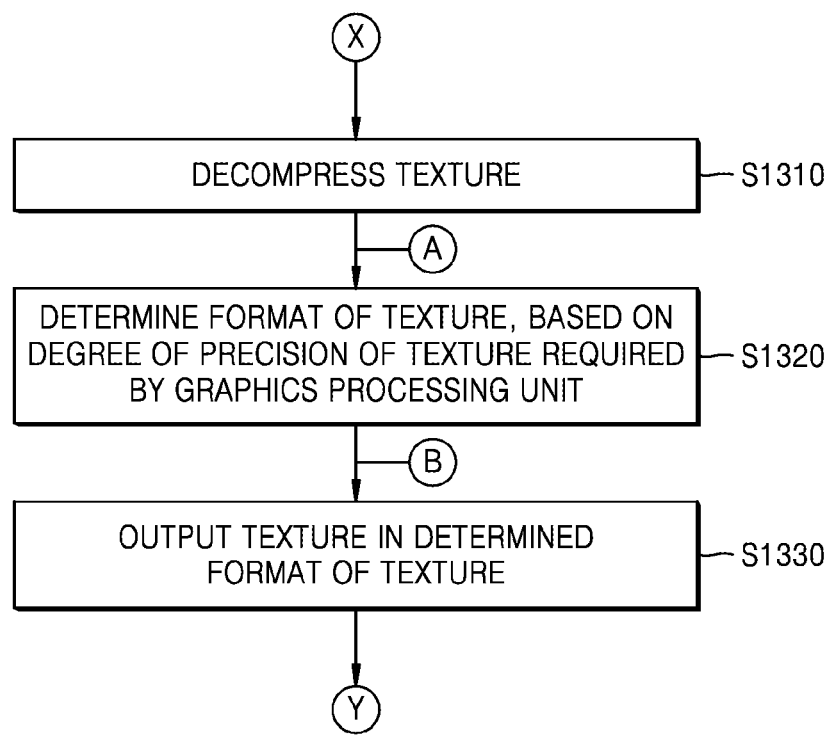
FIG. 13 is a detailed flowchart of a process of converting a format of a texture in a texture processing method, according to another embodiment.
Figure 14:
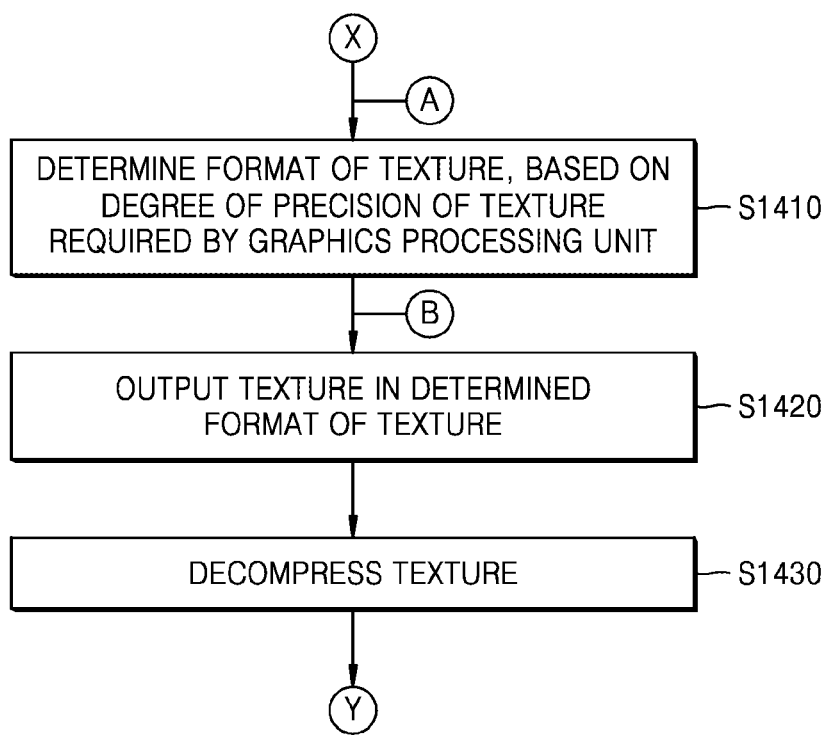
FIG. 14 is a detailed flowchart of a process of converting a format of a texture in a texture processing method, according to another embodiment.

On the other hand, the converting of the format of the texture may be performed according to a detailed flowchart of FIG. 13 or 14, based on whether in the texture processor 230 or 330, the format converter 135 is located at an input terminal of the texture filter 137 or an output terminal of the texture cache 133.

FIG. 13 is a detailed flowchart of the converting of a format of the texture in the texture processing method, according to another embodiment. More specifically, FIG. 13 illustrates a process of converting a format of the texture when the format converter 135 is located between the decompressor 134, which is located at the output terminal of the texture cache 133, and the input terminal of the texture filter 137.

In operation S1310, the texture processor 230 decompresses a compressed texture read from the texture cache 133.

In operation S1320, the texture processor 230 determines a format of the decompressed texture, based on a degree of precision of a texture required by the GPU 100.

In operation S1330, the texture processor 230 outputs the decompressed texture in the determined format.

FIG. 14 is a detailed flowchart of converting of a format of the texture in the texture processing method, according to another embodiment. More specifically, FIG. 14 illustrates a process of converting a format of the texture when the format converter 135 is located at the output terminal of the texture cache 133, and the texture cache 133 and the format converter 135 are located between the texture processor 330 and the memory 200.

In operation S1410, the texture processor 330 determines a format of the texture, based on a degree of precision of a texture required by the GPU 100.

In operation S1420, the texture processor 330 outputs the texture in the determined format. As the format of the texture is converted, the amount of traffic between the texture processor 330 and the texture cache 133 may decrease.

In operation S1430, the texture processor 330 decompresses the texture which is output in the determined format and is compressed.

Referring back to FIG. 9, in operation S940, the texture processor 130/230/330 performs texture filtering using the texture whose format is converted. If the format of the texture is not converted, texture filtering may be performed using the texture whose format is maintained.

The apparatuses, units, modules, devices, and other components (e.g., the rasterizer 110, shader-core 120, texture processors 130, 230, and 330, controller 131, texture cache 133, decompressors 134 and 136, format converter 135, texture filter 137, pixel processor 140, tile buffer 150 and memory 200) illustrated in FIGS. 1 and 3-8 that perform the operations described herein with respect to FIGS. 2 and 9-14 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 2 and 9-14. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2 and 9-14 that perform the operations described herein with respect to FIGS. 1 and 3-8 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A texture processor comprising:
   a texture cache configured to store textures;
   a controller configured to determine a texture address corresponding to a requested texture and read a texture, among the stored textures, corresponding to the texture address from the texture cache;
   a format converter configured to selectively convert an n-bit floating point format or an n-bit fixed point format of the read texture into an m-bit floating point format or an m-bit fixed point format, respectively, where m<n, based at least in part on a degree of texture precision required by a graphics processing unit (GPU), the degree of texture precision being based on a texture filtering mode and a type of application programming interface (API) used in the GPU; and
   a texture filter configured to perform texture filtering using the read texture having its format converted into the m-bit floating point or m-bit fixed point format,
   wherein if the read texture has an n-bit floating point format, the format converter selectively converts the n-bit floating point format into the m-bit floating point format, and if the read texture has the n-bit fixed point format, the format converter selectively converts the n-bit fixed point format into the m-bit fixed point format.

2. The texture processor of claim 1, wherein, n is twice m.

3. The texture processor of claim 1, wherein the format converter is configured to convert the format of the read texture into the m-bit floating point or m-bit fixed point format based further on a determination of whether residual battery power is sufficient to process a certain number of threads.

4. The texture processor of claim 1, wherein the format converter is configured to convert the format of the read texture into the m-bit floating point or m-bit fixed point format based at least in part on whether the texture filtering mode is point filtering, bilinear filtering or trilinear filtering.

5. The texture processor of claim 1, wherein the format converter is configured to determine the degree of texture precision required by the GPU by further taking into account a level of rendering that the GPU is requested to perform.

6. The texture processor of claim 5, wherein the level of rendering that the GPU is requested to perform is determined by a user through an application linked to the GPU or is determined by the GPU based on hardware resources of the GPU.

7. The texture processor of claim 1, wherein the format converter is configured to convert the format of the read texture into the m-bit floating point or m-bit fixed point format based at least in part on whether the texture filtering mode is point filtering, bilinear filtering or trilinear filtering, the point filtering being a texture filtering mode in which, when a texture that is to be added to an object to be rendered is determined, four neighboring texels are obtained and a nearest texel among the four neighboring texels is output, based on coordinates of the texture, and wherein if the texture filtering mode is point filtering, the format converter maintains the format of the read texture without conversion into the m-bit floating point or m-bit fixed point format.

8. The texture processor of claim 1, wherein the texture filter is configured to perform texture filtering by driving a filter corresponding to the converted format.

9. The texture processor of claim 1, further comprising a decompressor configured to decompress the read texture, and wherein the format converter is configured to convert a format of the decompressed texture into the m-bit floating point or m-bit fixed point format based on the degree of texture precision required by the GPU.

10. The texture processor of claim 1, wherein the format converter outputs a compressed texel block of the texture which had its format converted into the m-bit floating point or m-bit fixed point format, the texture processor further comprising a decompressor that receives the compressed texel block output by the format converter and decompresses the compressed texel block into a decompressed texture, and wherein the texture filter is configured to perform texture filtering using the decompressed texture.

11. A texture processing method comprising:
determining a texture address corresponding to a requested texture;
reading a texture corresponding to the texture address from a texture cache;
if a format of the read texture is an n-bit floating point format, where n equals a predetermined integer, converting the n-bit floating point format into an m-bit floating point format, where m<n;
if a format of the read texture is an n-bit fixed point format, converting, the n-bit fixed point format into an m-bit fixed point format;
if the format of the read texture is not one of the n-bit floating point format or the n-bit fixed point format, selectively converting a format of the read texture into another format, based at least in part on a degree of texture precision required by a graphics processing unit (GPU), the degree of texture precision being based on a texture filtering mode and a type of application programming interface (API) used in the GPU; and
performing texture filtering using the read texture having its format converted into the m-bit floating point format, the m-bit fixed point format, or said another format,
wherein the degree of texture precision is based at least in part on whether the texture filtering mode is point filtering, bilinear filtering or trilinear filtering, the point filtering being a texture filtering mode in which, when a texture that is to be added to an object to be rendered is determined, four neighboring texels are obtained and a nearest texel among the four neighboring texels is output, based on coordinates of the texture, and wherein if the texture filtering mode is point filtering, the format of the read texture is maintained without conversion into said another format.

12. The texture processing method of claim 11, wherein n is twice m.

13. The texture processing method of claim 11, wherein said selectively converting the format of the read texture is further based on a determination of whether residual battery power is sufficient to process a certain number of threads.

14. The texture processing method of claim 11, wherein the degree of texture precision is based at least in part on whether the texture filtering mode is point filtering, bilinear filtering or trilinear filtering.

15. The texture processing method of claim 11, wherein the degree of texture precision required by the GPU is further based on a level of rendering that the GPU is requested to perform.

16. The texture processing method of claim 11, wherein the performing of the texture filtering comprises performing texture filtering by driving a filter corresponding to the converted format.

17. The texture processing method of claim 11, further comprising decompressing the read texture, and wherein the converting of the format of the read texture comprises converting a format of the decompressed texture based on the degree of texture precision required by the GPU.

18. The texture processing method of claim 11, further comprising decompressing the read texture after its format was converted into said another format, and wherein the performing of the texture filtering comprises performing texture filtering using the decompressed texture.

19. A non-transitory computer-readable recording medium comprising programmed instructions operable to cause a computer to perform a texture processing method, the method comprising:
determining a texture address corresponding to a requested texture;
reading a texture corresponding to the texture address from a texture cache;
if a format of the read texture is an n-bit floating point format, where n equals a predetermined integer, converting the n-bit floating point format into an m-bit floating point format,
where m<n;
if a format of the read texture is, an n-bit fixed point format converting the n-bit fix point format into an m-bit fixed point format;
if the format of the read texture is not one of the n-bit floating point format or the n-bit fixed point format, selectively converting a format of the read texture into another format, based at least in part on a degree of texture precision required by a graphics processing unit (GPU), the degree of texture precision being based on a texture filtering mode and a type of application programming interface (API) used in the GPU; and
performing texture filtering using the read texture having its format converted into the m-bit floating point format, the m-bit fixed point format, or said another format,
wherein the degree of texture precision is based on at least in part on whether the texture filtering mode is point filtering, bilinear filtering or trilinear filtering, the point filtering being a texture filtering mode in which, when a texture that is to be added to an object to be rendered is determined, four neighboring texels are obtained, and a nearest texel among the four neighboring texels is output, based on coordinates of the texture, and wherein if the texture filtering mode point filtering, the format of the read texture is maintained without conversion into said another format.

20. The non-transitory computer-readable recoding medium of claim 19, wherein n equals 32 and m equals 16.

* * * * *